Oct. 16, 1951     A. J. DESNOYERS     2,571,546

MOLDING PRESS FOR PLASTIC DENTAL PLATES

Filed Sept. 14, 1949

INVENTOR.
ARCHIE J. DESNOYERS
BY
Charles R. Fay, atty.

Patented Oct. 16, 1951

2,571,546

UNITED STATES PATENT OFFICE 2,571,546

MOLDING PRESS FOR PLASTIC DENTAL PLATES

Archie J. Desnoyers, Fitchburg, Mass.

Application September 14, 1949, Serial No. 115,650

4 Claims. (Cl. 18—5.7)

1

This invention relates to apparatus for the making of improved dental plates and the like and the principal object of the invention resides in the provision of an apparatus which will produce an exact reproduction of the model or waxed casing, the apparatus being such that plastic dentures are made which do not shrink or warp and which do away with the necessity of curing in water as has always been the case in the prior art; the provision of an apparatus for making molded plastic dentures and curing the same in a matter of a few minutes as compared with the prior art devices which require pressing and curing for several hours in water and which even then do not obtain exact reproduction; the provision of an apparatus as described for manufacture of plastic dental plates under pressure including means automatically driving the plastic into the mold with regulated pressure such as to prevent any expansion of the plastic molding material whatever and also preventing contraction after removal of the finished plate from the mold.

A further object of the invention resides in the provision of a new and improved molding apparatus comprising a pair of platens, one of which is relatively fixed and the other of which is movable with respect thereto on guide posts or the like, the guide posts being supported on a base, and having a pair of rams on the base, said rams being subjected to equal hydraulic pressure under control of the operator and being adapted to raise the movable platen so as to securely clamp and firmly hold the molding flask between the platens, one of said rams having double plungers, one of which is adapted to extend through an aperture in the movable platen and into a cylinder at one side of the flask for the purpose of compressing the plastic material therein to accomplish the molding operation under pressure such as will prevent any expansion in the flask with consequent lack of contraction during curing or afterwards, so that the resultant dental plate is exactly according to the pattern and will not warp, contract, or expand in any way during use so that the exact molded shape is retained indefinitely for better fit and more comfortable use of the dental plates, the other plunger operating to move the platen.

Other objects and advantages of the invention will appear hereinafter.

Reference is to be had to the accompanying drawings in which

Figure 1:
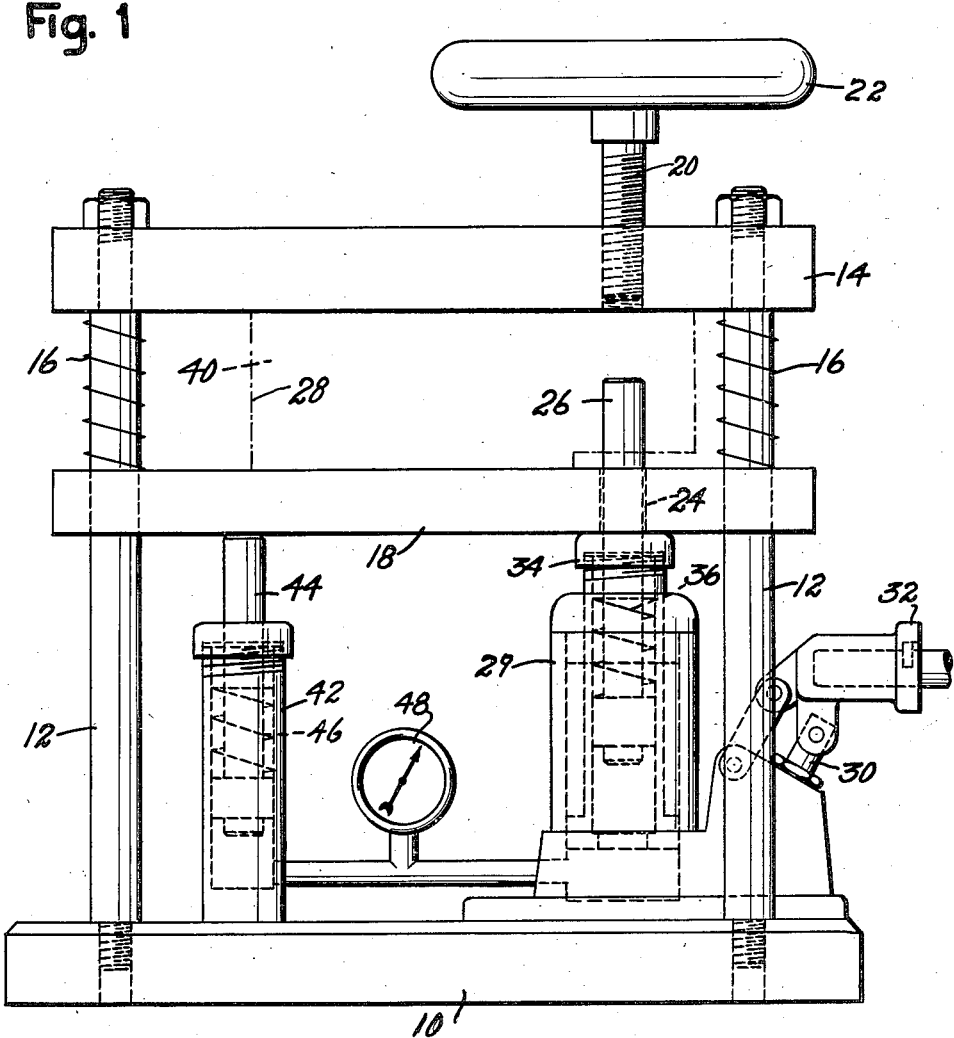

Fig. 1 is a view in elevation of the new press illustrating the invention; and

2

Figure 2:
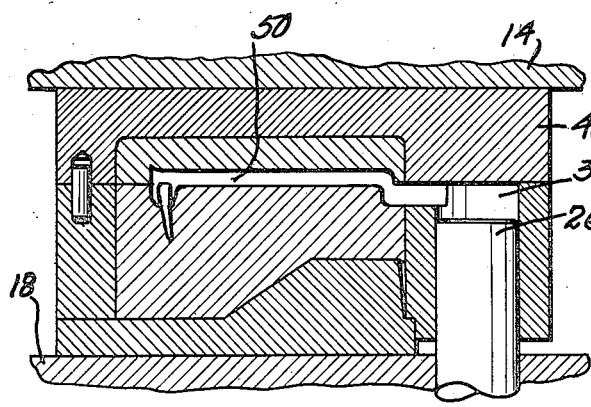

Fig. 2 is an enlarged horizontal section through the flask illustrating the action of the plunger.

As shown in the drawing, there is a base 10 upon which are suitably mounted a plurality of guide posts 12 in a vertical relation thereon, said guide posts having secured thereto at their upper ends by any suitable means, a fixed platen 14. Below the platen 14 there are provided a series of compression springs 16 and below the springs there is slidably mounted on the guide rods 12 a lower platen 18 normally separated from the upper platen by means of springs 16 as well as by gravity.

Platen 14 is provided with a threaded hole for the reception of a threaded plunger 20 having a hand wheel 22 to operate the same; and platen 18 is provided with a through hole 24 for the passage therethrough of a plunger 26. The broken outline 28 illustrates the position of the flask to be described when it is in the press and the plunger 26 is illustrated relative thereto in operative position to carry out the operations and functions of the invention.

The plunger 26 forms one part of a double plunger construction of a ram 29 mounted on base 10 and operated by a plunger 30 in turn operated by a handle 32 in a more or less usual manner to raise the plungers 26 and 34, the latter being in the form of a cylinder containing plunger 26 and there being a spring 36 to retract plunger 26 downwardly relative to cylindrical plunger 34.

When the device is pumped up, the cylindrical plunger 34 rises first carrying with it plunger 26, but in retracted position as determined by the spring 36. When, however, plunger 34 is stopped from rising, by its engagement with the underside of platen 18, then plunger 26 continues to rise relative to plunger 34, through hole 24 and into operative engagement with a cylinder 38 in the flask 40 to accomplish the compression molding operation.

Another ram 42 contains a plunger 44 similar to that at 26 and having a spring 46 to retract the same in its casing. The pressure in the ram 29 is transmitted equally to ram 46 and this pressure may be indicated on a dial 48. Plunger 44 cooperates with plunger 34 in raising and clamping 18 evenly so that it is completely incapable of canting or sticking on the guide posts 12. Springs 36 and 46 cause the plunger to retract when the pressure is released even though the plungers tend to stick so that it is not necessary to push them down.

The flask as shown in Fig. 2 is similar to the one disclosed in my co-pending application, S. N. 9,246, filed February 18, 1948, now Patent No. 2,565,481, and comprises two parts forming the cavity for the plaster in which the subject to be molded makes an impression as at 50. This is the cavity which is to be filled with plastic material to make the dental plate.

It is to be noted that cylinder 38 is completely to one side of cavity 50, and in the operation of the device, the cylinder 38 as well as the cavity 50 is manually filled with plastic molding compound. The flask then being located in correct position, i. e., upside down on the platen 18, the handle 32 is operated to create pressure raising the plungers 34 and 44 and exerting considerable pressure on the flask clamping the same in position; and when this pressure reaches a predetermined amount, plunger 26 starts to rise and enters cylinder 38 compressing the material therein and causing it to flow to the left toward cavity 50. Very often a pressure of 1500 p. s. i. is used and it will be seen that although easily obtainable, this pressure absolutely prevents any expansion of the plastic molding compound under conditions of heat rendering the compound extremely dense.

After exerting such pressure for a period of 10-20 minutes, depending on circumstances, the flask may be removed from the press and is merely air cured for another 10-20 minutes during which a second flask may be operated upon as above described.

After this air curing, the dental plate is complete. Therefore, it will be seen that the production of this machine is extremely fast as compared with the three or more hour process required by the most modern methods in the prior art.

Due to the high pressure exerted on the molding material, the resultant plate is dense, non-contracting, non-warping, and an absolute reproduction of the model from which cavity 50 was originally molded.

The hand wheel 22 and threaded plunger 20 are adapted for use in emergencies or for additional curing or the like if such should happen to become necessary. Of course, it is to be understood that platens 14 and 18 are heated as disclosed in my prior application above referred to.

Having thus described my invention and the advantages thereof, I do not wish to be limited to the details herein disclosed, otherwise than as set forth in the claims, but what I claim is:

1. Apparatus for making dental plates of moldable plastic material comprising a base, guide rods thereon, relatively fixed and movable platens on the guide rods, a hydraulic ram on the base adapted to move the movable platen toward the fixed platen, a hole in the movable platen, and means operated by said ram for exerting pressure on molding material in a flask clamped between the platens, said ram comprising two plungers one of which is adapted to contact and move the movable platen and the other one of which is adapted to extend through the hole and beyond the movable platen into operative relationship with the flask.

2. Apparatus for making dental plates of moldable plastic material comprising a base, guide rods thereon, relatively fixed and movable platens thereon, a hydraulic ram on the base adapted to move the movable platen toward the fixed platen, and means operated by said ram for exerting pressure on molding material in a flask clamped between the platens, and a second ram removed from the first named ram and exerting pressure on the platen.

3. Apparatus for making dental plates of moldable plastic material comprising a base, guide rods thereon, relatively fixed and movable platens thereon, a hydraulic ram on the base adapted to move the movable platen toward the fixed platen, and means operated by said ram for exerting pressure on molding material in a flask clamped between the platens, said means comprising a plunger operatively associated with the ram, and a spring in the ram tending to retract the plunger.

4. Apparatus of the class described comprising a base, a fixed platen, a movable platen, a hydraulic ram on the base, a cylindrical plunger for the ram and a second plunger in the cylindrical plunger, the latter contacting the movable platen, the movable platen having a hole in it, the second plunger extending through the hole, a flask clamped by the platens, and a cylinder in the flask, said cylinder opening downwardly in line with the second plunger.

ARCHIE J. DESNOYERS.

REFERENCES CITED

The following references are of record in the file of this patent:

UNITED STATES PATENTS

| Number | Name | Date |
|---|---|---|
| 1,952,951 | Stehley | Mar. 27, 1934 |
| 2,410,909 | Tucker | Nov. 12, 1946 |
| 2,420,405 | Alves | May 13, 1947 |
| 2,424,906 | Sharrock et al. | July 29, 1947 |
| 2,442,847 | Galley | June 8, 1948 |

FOREIGN PATENTS

| Number | Country | Date |
|---|---|---|
| 687,432 | Germany | Jan. 29, 1940 |